April 1, 1941.                H. C. DREIBUSS ET AL                2,236,566
                                    CAR TRUCK
                                 Filed May 1, 1939                 3 Sheets-Sheet 3
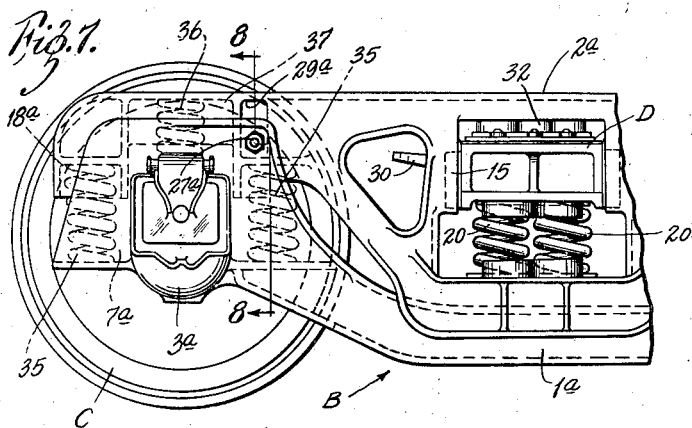
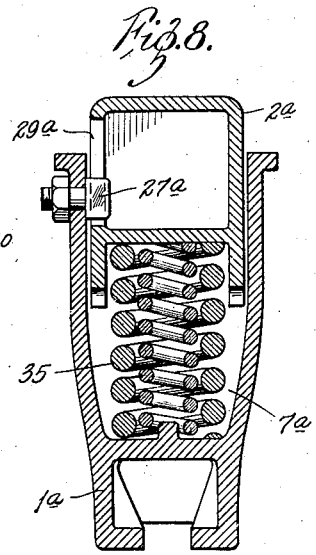
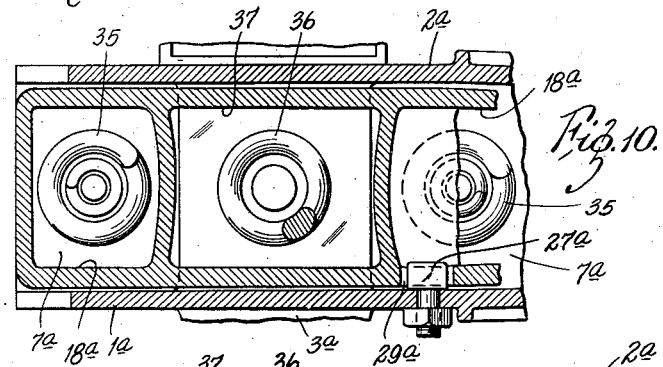
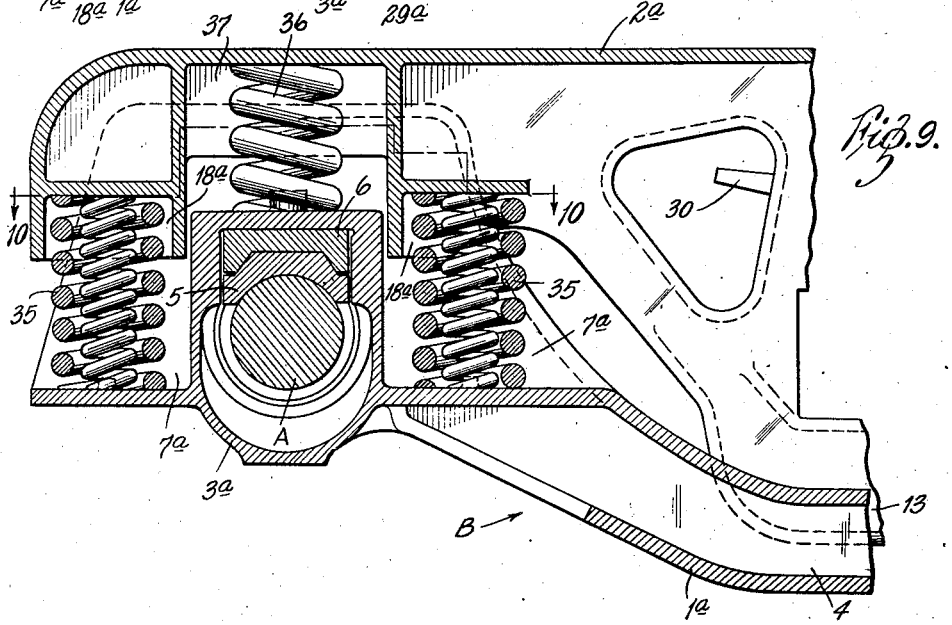
INVENTORS
Harry C. Dreibuss and
Fred H. Spenner,
by Carr & Carr, Gravely
THEIR ATTORNEYS.

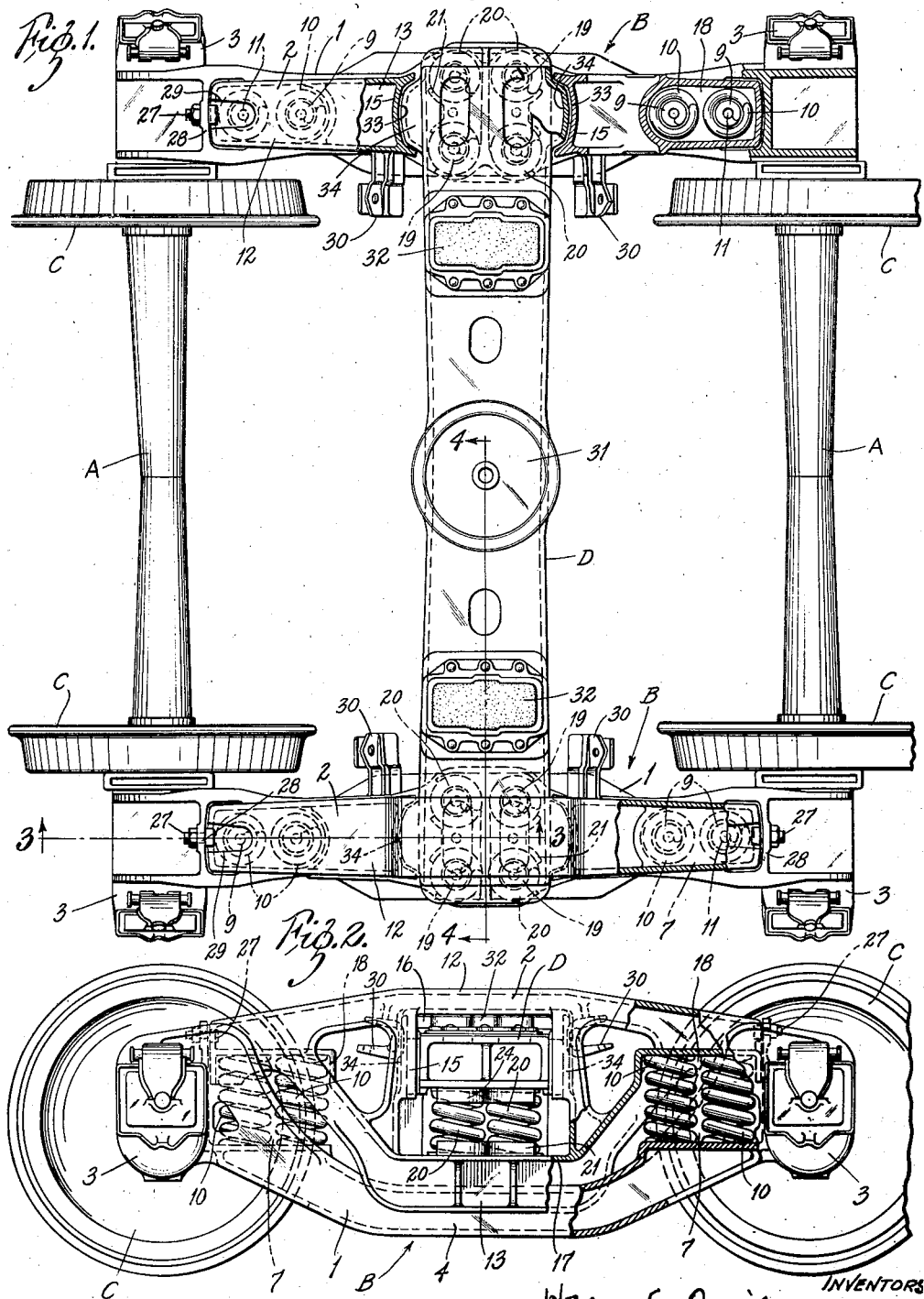

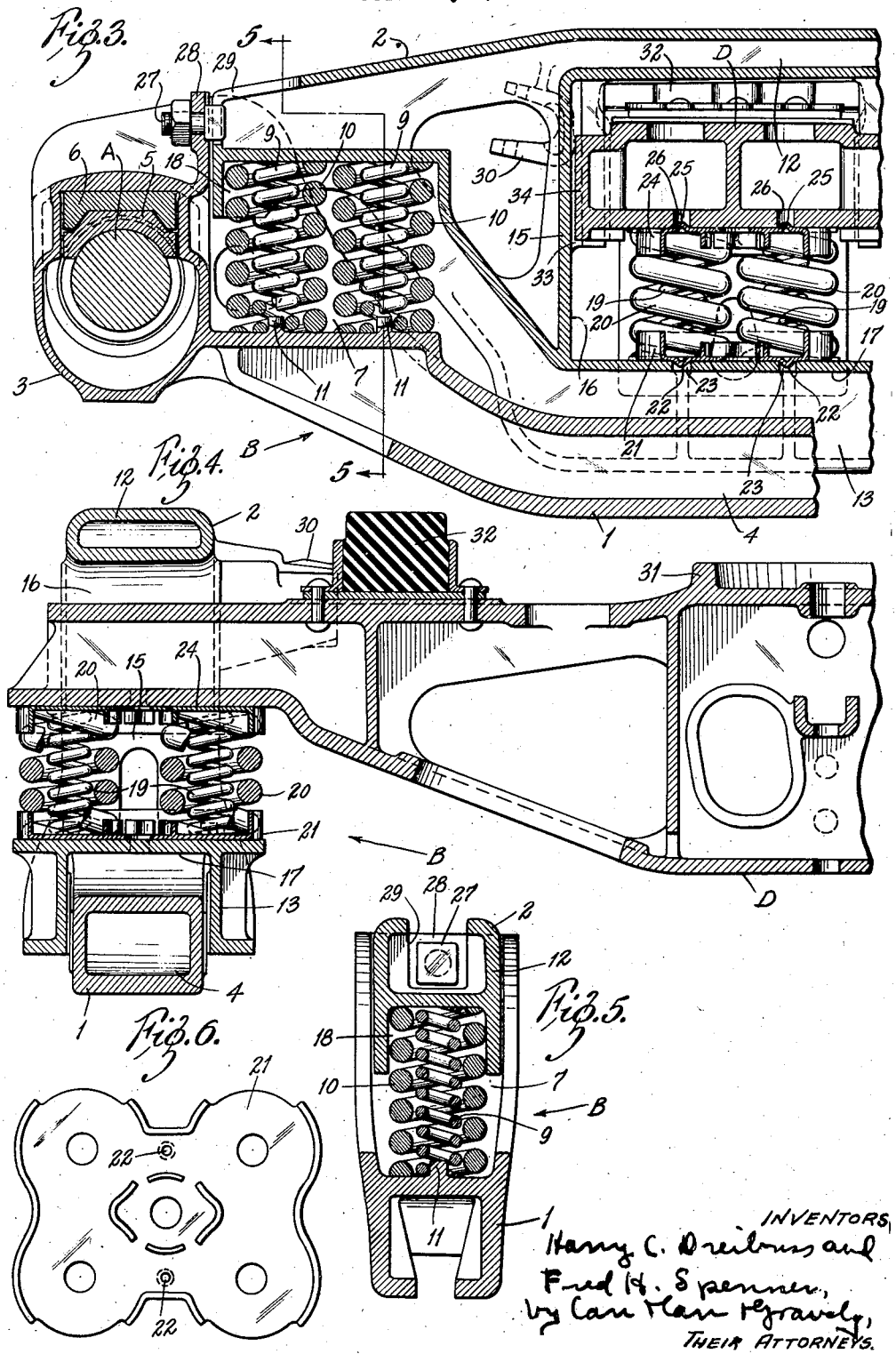

Patented Apr. 1, 1941

2,236,566

UNITED STATES PATENT OFFICE 2,236,566

CAR TRUCK

Harry C. Dreibuss and Fred H. Spenner, St. Louis, Mo., assignors to Scullin Steel Co., St. Louis, Mo., a corporation of Missouri Application May 1, 1939, Serial No. 270,954

22 Claims. (Cl. 105—197.2)

This invention relates to car trucks. It has for its principal objects to devise a strong, durable and lightweight truck that will provide for increased load carrying capacity and greater flexibility in operation; that will reduce the amount of unsprung weight; that will distribute the load equally to the axles; that will cushion destructive shocks and dampen vibration transmitted to the wheels from the track under conditions of maximum loading, high speed operation and other service conditions without damage to the equipment or lading or danger of derailment; and that will provide for simplicity of construction of the parts and consequent economical casting thereof and, at the same time, provide efficient swivel connections between the truck bolster and side frames that will permit one side frame to run in advance of the other when the truck is traveling over curved track. The invention consists in the car truck and in the construction, combinations and arrangements of parts hereinafter described and claimed.

In the accompanying drawings, which form part of this specification and wherein like symbols refer to like parts wherever they occur—

Fig. 1 is a part plan and part horizontal sectional view of a car truck embodying our invention, Fig. 2 is a side elevational view of said truck with parts thereof shown in vertical longitudinal section, Fig. 3 is an enlarged fragmentary vertical longitudinal section on the line 3—3 in Fig. 1, Fig. 4 is an enlarged fragmentary vertical transverse section on the line 4—4 in Fig. 1, Fig. 5 is a vertical cross-section on the line 5—5 in Fig. 3, Fig. 6 is a plan view of one of the bolster spring seats, Fig. 7 is a fragmentary side elevation of a truck showing a modified arrangement of the journal box springs, Fig. 8 is an enlarged vertical cross-section on the line 8—8 in Fig. 7, Fig. 9 is a vertical longitudinal section through the truck side frame; and Fig. 10 is a horizontal section on the line 10—10 in Fig. 9.

Our car truck comprises a pair of axles A connected at their corresponding ends by side frames B, wheels C rigid with said axles adjacent to the inner sides of said side frames, and a cast metal bolster D connecting said side frames midway of said axles. Each of the truck side frames B comprises two sections, an integral lower or journal box connecting section 1 and an integral upper or bolster supporting section 2.

The lower side frame section 1 has journal boxes 3 formed integral with the ends thereof and is offset downwardly, as at 4, between said boxes. Said journal boxes enclose the journals of the respective axles, the journal bearings 5 and wedges 6 therefor and the oil for lubricating said bearings. The lower side frame section has inwardly and upwardly opening flat-bottomed pockets 7 formed therein adjacent to the journal boxes 3 that are adapted to receive and support two unit nests of springs, each unit preferably comprising vertically disposed reversely-wound inner and outer helical coil springs 9 and 10, respectively, that are held in place at their lower ends by upstanding lugs 11 in the bottoms of said pockets.

The upper side frame section 2 comprises compression and tension members 12 and 13, respectively, that converge towards the ends of said section and are connected intermediate said ends by spaced column guides 15 to form a bolster opening 16. The tension member 13 of the upper side frame section has a longitudinal channel 17 in the underside thereof adapted to receive the depressed middle portion 4 of the lower side frame section; and the ends of said upper section extend into the pockets 7 in said lower section and seat on the upper ends of the double coil springs therein. As shown in the drawings, said ends of said upper section have downwardly opening pockets 18 that receive and retain the upper ends of said springs therein.

The bolster D is yieldably supported in the bolster opening 16 of each upper side frame section 2 preferably by means of a four unit nest of helical coil springs, each unit preferably comprising reversely wound inner and outer coils 19 and 20, respectively, the lower ends of said springs being seated in a flanged spring seat 21 that rests on the top of the tension member 13 of the upper side frame section and has downwardly projecting bosses 22 that fit within vertical holes 23 provided therefor in said member and thus prevent horizontal displacement of said seat. The upper ends of the bolster springs seat in a downwardly flanged spring seat 24 which bears against the underside of the bolster and is held against horizontal displacement by bosses 25 that are formed on the upper surface of said seat and seat in vertical openings 26 provided therefor in the underside of said bolster. The two sections of each side frame are removably secured together against vertical separation preferably by means of bolts 27 that extend through upstanding horizontal cross-webs 28 formed in the lower side frame section opposite the ends of the upper side frame section with their heads seated in upwardly opening notches 29 in said ends of said upper section.

The upper side frame section has suitable brake hanger brackets 30 formed integral therewith that project inwardly from the column guides 15. The bolster has an upstanding center plate ring 31 formed integral therewith and is also provided with suitable side bearings 32.

The bolster has swivel connections with the respective side frames that permit one side frame of the truck to run in advance of the other side frame and horizontal angling of the bolster when the truck is traveling over a curved track. Each of these connections comprises a vertical channel 33, which is formed in the bolster opposing side of the column guide 15 of the upper side frame section 2 and has a transversely concave bottom, and a hollow outstanding vertical rib 34 which is cast integral with the adjacent side wall of the bolster and seats in said channel and has a transversely convex surface curved in conformity with the concave surface of said channel. This swivel joint connection between the bolster and the column guides of the side frame permits horizontal angling movement therebetween, which movement is limited by the side flanges of the channel-shaped column guides.

The hereinbefore described truck construction has numerous advantages. The two axles of the truck are connected together in proper spaced relation by the load supporting lower or journal box connecting sections, and these sections, together with the journal boxes, wheels and axles constitute the only unsprung weight of the truck. At each end of the bolster, the load is transmitted to the tension member of the upper or bolster supporting section of the side frame through a four unit group of double coil springs and is thence transmitted from the opposite ends of said upper section to said lower section at points adjacent to the journal boxes thereof through the two unit nests of double coil springs. Thus, the vertical load is transmitted to the two axles of the truck through sixteen double coil springs that have ample capacity for taking care of loads in excess of the rated maximum load capacity for modern freight cars. These springs also serve to cushion destructive shocks and dampen vibration transmitted to the wheels from the track under conditions of maximum loading and high speed operation and thus prevent damage to the equipment, truck parts, track or lading and danger of derailment. The shocks delivered to the wheels are transmitted from the lower side frame sections to the supporting springs for the upper side frame sections where they are absorbed, dampened or minimized; and any shocks or vibrations transmitted to the upper section will be absorbed by the bolster supporting springs supported thereon before they reach the bolster.

The riding qualities of the truck are further improved at high speeds by the wide separation of the spring groups and by providing bolster and journal box springs of different travel and length to thereby diminish vertical harmonic spring oscillations.

The ends of the upper section of the side frame fit within the spring pockets in the lower side frame section and the middle portion of said upper section straddles the corresponding portion of said lower section, thereby preventing lateral separation of the two sections, and the two sections are held against vertical separation by the removable retaining bolts. When the truck is traveling on a curved track, the swivel joint connections between the bolster and side frames permit one frame to run in advance of the other and the bolster to accommodate itself to such movement; and there is sufficient play in said joints to permit the bolster to tilt endwise when one side frame is raised above the level of the other side frame. In these swivel joints, the lugs or flanges which limit the horizontal angling movement of the bolster, are on the column guides and not on the bolster, thereby permitting accurate and economical casting of the bolster by eliminating the use of cores heretofore employed to define such lugs and enabling the convex ribs of the bolster to be formed by a direct part of the bolster pattern.

The invention is not limited to the precise shapes and arrangements of parts shown and described. For instance, in the modified construction shown in Figs. 7 to 10, inclusive, three coil springs are interposed between the upper and lower sections of the side frame at each end thereof. Two of these springs preferably comprise reversely wound double coil springs 35 seated in pockets 7a provided therefor in the lower section 1a on oposite sides of the journal box 3a; and the third spring preferably comprises a single coil spring 36 that seats on top of the journal box between the side walls of said lower section. The upper section 2a of the side frame extends between the side flanges of the lower section thereof across the top of the journal box and seats on the upper ends of the springs on top and on the sides of the journal box, said upper section having a downwardly opening pocket 37 adapted to receive and retain the upper end of the spring 36 and downwardly opening pockets 18a adapted to receive and retain the upper ends of the two springs 35. This arrangement equalizes the load around the journal box and provides for increased spring capacity. In this construction, the upper and lower sections of the truck side frame are releasably held together against vertical separation by means of a bolt 21a which extends horizontally through one side wall of the lower section and has its head mounted for vertical sliding but non-rotary movement in a slot 29a provided therefor in the adjacent side wall of the upper frame section.

What we claim is:

1. A spring-plankless car truck comprising side frames, wheeled axles and a bolster, each of said side frames comprising a one piece section connecting said axles and sustained thereby and a one-piece section yieldably supported on the axle connecting section and in turn yieldably supporting said bolster and having a vertically sliding connection therewith, said bolster constituting the only cross-connection between the bolster supporting sections of said side frames, and said bolster supporting sections being entirely free of said axles and sustained entirely by said axle connecting sections.

2. A spring-plankless car truck comprising side frames, wheeled axles and a bolster, each of said side frames comprising upper and lower sections operatively connected for relative vertical but nonlateral movement, one of said sections connnecting said axles and the other of said sections being yieldably supported at its ends on the axle connecting section and in turn yieldably supporting said bolster intermediate said ends and having a vertically sliding connection therewith, said bolster constituting the only cross-connection between the bolster supporting sections of said side frames, and said bolster supporting sections being entirely free of said axles and sustained entirely by said axle connecting sections.

3. A spring-plankless car truck comprising side frames, wheeled axles and a bolster, each of said side frames comprising an integral load supporting section connecting said axles and sustained thereby and an integral frame section supported on the axle connecting section for vertical yielding movement relative thereto and having a tension member on which said bolster is supported for vertical yielding movement relative thereto, said bolster having vertical sliding connections with the supporting sections therefor and constituting the only cross-connection therebetween, and said bolster supporting sections being entirely free of said axles and sustained entirely by said axle connection sections.

4. A spring-plankless car truck comprising side frames, wheeled axles and a bolster, each of said side frames comprising a load supporting section connecting said axles and in turn sustained thereby and a section resiliently supported on the axle connecting section and resiliently supporting said bolster and having a vertically sliding connection therewith, said bolster constituting the only cross-connection between the bolster supporting sections of said side frames, and said bolster supporting sections being entirely free of said axles and sustained entirely by said axle connecting sections.

5. A spring-plankless car truck comprising side frames, wheeled axles and a bolster, each of said side frames comprising a lower load supporting section spanning from axle to axle and sustained thereby and an upper section resiliently supported at its ends on the axle connecting section and in turn resiliently supporting said bolster between said ends, said bolster having vertical sliding connections with the supporting sections therefor and constituting the only cross-connection therebetween, and said bolster supporting sections being entirely free of said axles and sustained entirely by said axle connection sections.

6. A spring-plankless car truck comprising side frames, wheeled axles and a bolster, each of said side frames comprising a lower load supporting section spanning from axle to axle and sustained thereby and an upper section resiliently supported at its ends on the axle connecting section and in turn resiliently supporting said bolster between said ends, said bolster having vertical sliding connections with the supporting sections therefor and constituting the only cross-connection therebetween, and said bolster supporting sections being entirely free of said axles and sustained entirely by said axle connection sections, said sections having interfitting portions adapted to resist relative lateral movement thereof while permitting relative vertical movement thereof.

7. A spring-plankless car truck comprising side frames, wheeled axles and a bolster, each of said side frames comprising a section connecting said axles and sustained thereby and a section located above and extending longitudinally of said lower section between said axles and supporting said bolster, and springs interposed between the end portions of the bolster supporting section and said axle connecting section and between the middle portion of said bolster supporting section and the adjacent end of said bolster, said end of said bolster having a vertical sliding connection with said bolster supporting section, said bolster constituting the only cross-connection between the bolster supporting sections of said side frames.

8. A spring-plankless car truck comprising side frames, wheeled axles and a bolster, each of said side frames comprising a lower section connecting said axles and sustained thereby and a single upper bolster supporting section extending longitudinally of said lower section in the vertical plane thereof, and springs seated on said lower section adjacent to the respective axles and supporting the end portions of said upper section, and springs seated on said upper section and supporting said bolster, said upper and lower sections having their end and middle portions interlocked against lateral separation and vertical sliding connections between said bolster and the upper sections of said side frames, said bolster constituting the only cross-connection between said upper sections.

9. A car truck comprising side frames, wheeled axles and a bolster, each of said side frames comprising a section connecting said axles and a section having an opening therethrough midway of the ends thereof adapted to receive an end of said bolster, a group of coil springs seated in said bolster opening and supporting said end of said bolster therein, and groups of coil springs seated on said axle connecting section adjacent to said axles and supporting the respective ends of the bolster receiving section.

10. A car truck comprising side frames, wheeled axles and a bolster, each of said side frames comprising a lower section connecting said axles and an upper section having an opening therethrough midway of the ends thereof adapted to receive an end of said bolster, vertically disposed double coil springs seated in the bolster receiving opening of said upper section and supporting said end of said bolster therein, and groups of double coil springs seated on said lower section adjacent to said axles and supporting the respective ends of said bolster receiving section, said first and second mentioned spring groups differing in length and travel to thereby diminish vertical harmonic spring oscillations.

11. A car truck comprising side frames, wheeled axles and a bolster, each of said side frames comprising a section connecting said axles and a section supported on the axle connecting section and having an opening therethrough midway of the ends thereof adapted to receive an end of said bolster, springs interposed between said bolster and the bottom of the bolster opening in the bolster supporting section, and springs interposed between said axle connecting section and the ends of said bolster supporting section, said axle connecting section having upwardly opening pockets therein forming lower spring seats for said last mentioned springs and said ends of said bolster supporting section having downwardly opening pockets therein forming upper seats for said last mentioned springs.

12. A car truck comprising side frames, wheeled axles and a bolster, each of said side frames comprising a section connecting said axles and a section supported on the axle connecting section and having an opening therethrough midway of the ends thereof adapted to receive an end of said bolster, springs interposed between said bolster and the bottom of the bolster opening in the bolster supporting section, and springs interposed between said axle connecting section and the ends of said bolster supporting section, said axle connecting section having upwardly opening pockets therein forming lower spring seats for said last mentioned springs and said ends of said bolster supporting section having downwardly opening pockets therein forming upper seats for said last mentioned springs, said ends of said bolster supporting section extending into the upwardly opening pockets in said axle connecting section, and the middle portion of said bolster supporting section having depending side flanges adapted to overlap the middle portion of said axle connecting section.

13. A car truck comprising side frames, wheeled axles and a bolster, each of said side frames comprising a lower load supporting section connecting said axles and an upper section resiliently supported on the axle connecting section and having a bolster receiving opening and column guides defining the sides of said opening, means for resiliently supporting said bolster in said opening, and a connection between said bolster and said upper section permitting relative vertical and horizontal swinging movement thereof, said connection comprising vertical channels formed in the bolster opposing sides of said column guides and having transversely concave bottoms and outstanding vertical ribs on the column opposing sides of said bolster that seat in the respective channels and have transversely convex surfaces curved in conformity with the concave surfaces of said channels.

14. A spring-plankless car truck comprising side frames and a bolster, each of said side frames comprising a lower axle connecting section and an upper non-axle connecting section yieldably sustained by said lower axle connecting section and having an opening in which one end of said truck bolster is received and is sustained by the portion of said upper section that defines the bottom of said opening.

15. A spring-plankless car truck comprising side frames and a bolster, each of said side frames comprising a lower load supporting axle connecting section and an upper non-axle connecting bolster supporting section supported on said lower section for vertical yielding movement relative thereto and having an opening therethrough transversely thereof in which one end of said truck bolster is received and supported, said opening being shaped for cooperation with said end of said bolster to form a vertical sliding and horizontal swinging connection therewith.

16. A spring-plankless car truck comprising side frames and a bolster, each of said side frames comprising a lower load supporting axle connecting section having journal boxes rigid with the ends thereof and an upper non-axle connecting bolster supporting section resiliently supported at its ends adjacent to said journal boxes and having an opening extending therethrough midway of said ends in which an end of said truck bolster is received, retained and supported for vertical yielding movement.

17. A side frame for a spring-plankless car truck comprising a lower axle connecting section and an upper non-axle connecting section having an opening therethrough midway of the ends thereof adapted to receive an end of a truck bolster, groups of coil springs seated on said axle connecting section adjacent to said axles and supporting the respective ends of said bolster receiving section, and a group of coil springs seated on the bottom of the bolster receiving opening and adapted to support said end of said bolster.

18. A truck side frame comprising a lower axle connecting section and an upper bolster supporting section resiliently supported on the axle connecting section and having a bolster receiving opening and column guides defining the sides of said opening, said column guides having vertical channels formed in the opposing sides thereof with transversely concave bottoms adapted to form seats for correspondingly shaped ribs on said bolster.

19. A truck side frame comprising a lower axle connecting section and an upper bolster supporting section having an opening therethrough midway of the ends thereof adapted to receive an end of a truck bolster, and coil compression spring interposed between said axle connecting section and the ends of said bolster supporting section, said axle connecting section having upwardly opening pockets therein forming lower spring seats for said springs and the ends of said bolster supporting section having downwardly opening pockets therein forming the upper seats for said springs, said ends of said bolster supporting section extending into the upwardly opening pockets in said axle connecting section and the middle portion of said bolster supporting section having depending side flanges adapted to overlap the corresponding portion of said axle connecting section.

20. A side frame for a spring-plankless car truck comprising a lower axle connecting section having journal boxes rigid with the ends thereof and an upper non-axle connecting bolster supporting section resiliently supported on the axle connecting section, said sections having interfitting end and intermediate portions permitting relative vertical movement of said sections while preventing lateral separation thereof, the interfitting end portions of said sections comprising pockets in said lower section for the ends of said upper section, and the interfitting intermediate portions of said sections comprising a downwardly opening channel in the intermediate portion of said upper section adapted to receive the intermediate portion of said lower section.

21. A spring-plankless car truck comprising side frames, wheeled axles and a bolster, each of said side frames comprising a section connecting said axles and sustained thereby and a bolster supporting section located above and extending longitudinally of said lower section, said bolster supporting section having an opening extending horizontally through the middle portion thereof in which an end of said bolster is received and springs interposed between the end portions of the bolster supporting section and said axle connecting section on opposite sides of each axle and between the bottom of said bolster receiving opening and the underside of said end of said bolster.

22. A spring-plankless car truck comprising side frames, wheeled axles and a bolster, each of said side frames comprising an axle connecting section having journal boxes rigid with the ends thereof adapted to receive the respective axles and a bolster supporting section laterally interlocked at and intermediate its ends with said axle connecting section, said bolster supporting section having an opening extending horizontally through the middle portion thereof in which an end of said bolster is received, springs interposed between the bottom of said bolster receiving opening and the under side of said end of said bolster and springs interposed between said axle connecting and bolster supporting sections on opposite sides and ectly above each of said journal boxes.

HARRY C. DREIBUSS.
FRED H. SPENNER.

CERTIFICATE OF CORRECTION.

Patent No. 2,236,566. April 1, 1941.

HARRY C. DREIBUSS, ET AL.

It is hereby certified that error appears in the printed specification of the above numbered patent requiring correction as follows: Page 3, first column, line 16, claim 4, strike out the words "in turn" and insert the same before "resiliently" in line 18, same claim; and that the said Letters Patent should be read with this correction therein that the same may conform to the record of the case in the Patent Office.

Signed and sealed this 27th day of May, A. D. 1941.

(Seal)

Henry Van Arsdale,
Acting Commissioner of Patents.